United States Patent [19]
Bass

[11] 3,897,802
[45] Aug. 5, 1975

[54] PILOT VALVE OPERATOR FOR SAFETY RELIEF VALVE

[75] Inventor: Harold Eugene Bass, Pineville, La.

[73] Assignee: Dresser Industries, Inc., Dallas, Tex.

[22] Filed: June 17, 1974

[21] Appl. No.: 479,695

[52] U.S. Cl. ............................ 137/478; 137/491 X
[51] Int. Cl. ...................... F16k 17/32; F16k 31/12
[58] Field of Search ........... 137/469, 475, 476, 478, 137/491, 494

[56] References Cited
UNITED STATES PATENTS

| | | | |
|---|---|---|---|
| 2,754,842 | 7/1956 | Hagiwara | 137/478 X |
| 2,821,208 | 1/1958 | Farris | 137/478 |
| 2,875,978 | 3/1959 | Kmiecik | 137/469 X |
| 3,354,900 | 11/1967 | Ferrill | 137/478 X |
| 3,439,702 | 4/1969 | Ferrill | 137/478 |

*Primary Examiner*—Henry T. Klinksiek
*Attorney, Agent, or Firm*—Daniel Rubin

[57] ABSTRACT

A pilot valve for controlling main valve operation to relieve overpressure from a fluid system to which the main valve is connected. Opening and closing of the pilot valve is effected by a movable disc which carries with it an annular resilient gasket. A seating surface, defined on the end face of the inlet nozzle, cooperates with the gasket when the disc is in closed position for effecting a pressure tight seal against fluid flow to the discharge side of the valve. A perforated gasket retainer communicates exposure of upstream pressure to diirectly against the formed seal whereby at incipient lift of the disc initial flow discharge incurs minimum pressure drop therepast. A two-stage huddle chamber surrounding the seal area is capable of responding to the fluid pressure of even initial discharge to accelerate full lift opening of the disc.

13 Claims, 6 Drawing Figures

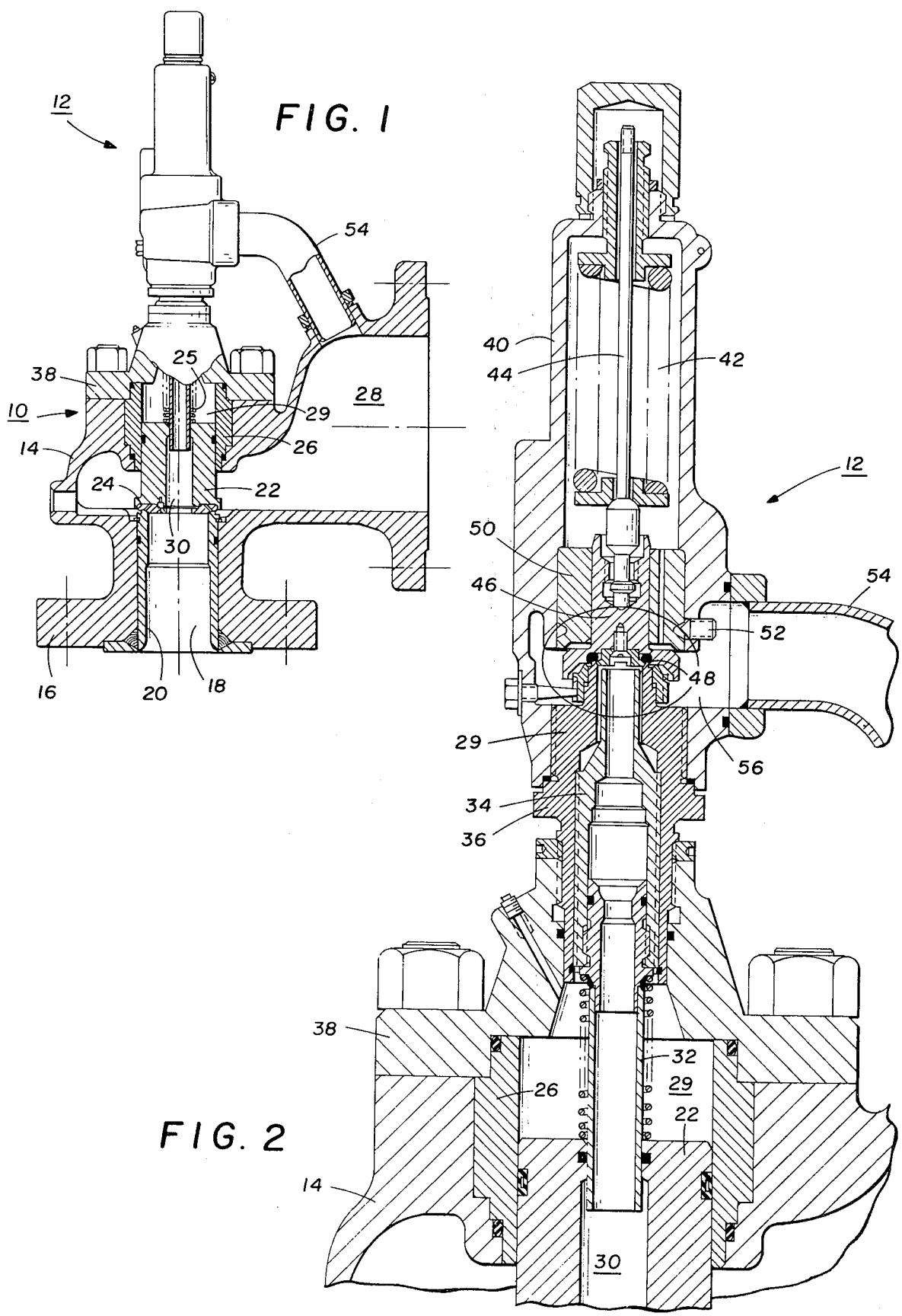

PILOT VALVE OPERATOR FOR SAFETY RELIEF VALVE

BACKGROUND OF THE INVENTION

1. The field of art to which the invention relates includes the art of Fluid Handling.

2. The majority of safety valves in use for steam service and the like are self-contained units directly responsive to system pressures for relieving overpressure when required. For large capacity requirements, it is fairly common to employ a relatively small pilot valve that is responsive to system pressure for controlling operation of the main valve through which relief is ultimately effected. This arrangement has principal advantages for large capacity requirements in affording a substantial reduction in main valve size enabling a more economic choice of operating components while substantially reducing the space requirements otherwise needed for installation of the valve. Typical uses of pilot operated main valves are disclosed in U.S. Pat. Nos. 3,439,702 and 3,815,628.

A characteristic construction to effect opening and closing for such pilot valves includes a movable disc having a tapered frusto-conical surface which cooperates with a frusto-conical seat formed about the inlet passage through which system pressure is received. On overpressure being encountered, the disc lifts from the seat in opposition to an applied spring force urging the disc toward closed position. Thereafter, continued buildup of system pressure gradually increases disc lift until flow discharge past the seat reacts against the surrounding huddle chamber. When the latter occurs, the disc is accelerated to full lift representing full open or capacity operating position of the valve.

While pilot valves of the above and similar types have generally performed well over the years, they have nonetheless been known to undesirably simmer at a substantial margin below and up to pop pressure when initial lift occurs. This condition is considered to be an operating deficiency in such valves and is generally attributed to high pressure drop encountered by the fluids attempting to flow through the elongated narrow passage existing at the onset of lift between the disc and seat. By virtue of such high pressure drop, fluid initially entering the surrounding huddle chamber is of insufficient pressure and quantity and therefore unable to perpetuate disc lift in the manner intended. As a consequence of the latter, simmer of the valve begins at a level below pop pressure and continues until the level of system pressure substantially exceeds the simmer pressure at which full lift discharge capacity was anticipated. Approaches at resolving this difficulty have generally hinged on careful selection of load spring characteristics. This has not proved successful and a ready solution to the problem has not heretofore been known.

SUMMARY OF THE INVENTION

The invention relates to relief valves and particularly to pilot valve operators for safety relief valves. More specifically, the invention relates to a pilot valve operator capable of substantially if not completely overcoming the problems of liftoff simmer associated with similar purpose valves of the prior art.

This is achieved in accordance herewith utilizing a disc which carries with it an annular resilient gasket adapted to cooperate with a seat defined on the end face of the inlet nozzle. On closure at or below set pressure conditions of the connected system, the gasket and seat cooperate to effect a pressure tight seal against discharge of upstream pressure. Also carried by the disc is a perforated gasket retainer having a frusto-conical seating surface. The retainer acts both as a guide during seating of the disc and to communicate upstream pressure through its apertures for direct exposure against the seal afforded between the gasket and seat. With this arrangement, only a minimum pressure drop is encountered at incipient lift assuring maximum inrush pressure of the fluid discharge even at minimal lift to substantially retain its overpressure on first entering the huddle chamber. By means of a two-stage huddle chamber formed at the underside of the disc, the first chamber immediately increases lift and the second chamber in sequence and operating in piston fashion, almost instantaneously accelerates lift to full lift position. Incident to the accelerated disc lift incurred in this arrangement, it has been found that operation is substantially less sensitive than previously to characteristics of the load spring. This has enabled a far fewer choice of different spring rates than previously required over the same capacity ranges of such valves.

It is, therefore, an object of the invention to provide a novel safety relief valve operative in response to overpressures to which it is connected.

It is a further object of the invention to provide a novel safety relief valve as in the previous object utilizing a soft seating relation in effecting valve closure.

It is a further object of the invention to provide a novel pilot valve operator for a safety relief valve.

It is a further object of the invention to provide a novel pilot valve operator able to substantially if not completely eliminate the simmer problem at incipient lift of the valve disc previously associated with similar purpose valves of the prior art.

It is a still further object of the invention to effect the foregoing objects through a construction that is relatively simple and uncostly as not to place such valves at a commercial disadvantage compared to such prior art valves on which the improvement hereof is unavailable.

BRIEF DESCRIPTION OF THE DRAWINGS

FIG. 1 is an elevation view partially in section of a pilot operated safety relief valve in accordance herewith;

FIG. 2 is an enlarged sectional elevation of the pilot valve structure shown in FIG. 1;

With reference to FIG. 1, there is shown a main valve 10 supporting a pilot operator valve in accordance herewith and designated 12. Main valve 10 is comprised of a body or casing 14 having a base flange 16 for mounting the valve to the pressure container or support piping carrying system pressure for which relief of overpressure is to be effected. A bore 18, defined by an annular sleeve liner 20 comprises the system pressure inlet for exposure to the underside of main disc 22. Urging disc 22 toward an annular seat 24 formed on the end face of liner 20 is a load spring 25. A main guide 26 supports the disc in position and permits its sliding movement upwardly for overpressure discharge past seat 24 to outlet 28. Defined by the guide is a dome 29 in which accumulated system pressure acts against the relatively larger diameter topside of the disc to aid spring 25. Likewise exposed simultaneously to system pressure at the underside of disc 22 (see also FIG. 2) is pilot valve 12 to which fluid pressure is communicated through central bore 30 of disc 22 connecting with a lower tube 32 in turn communicating with an upper tube 34.

Figure 3:
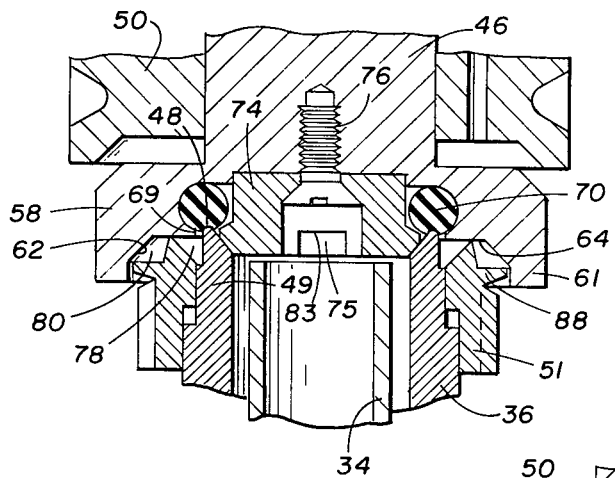
FIGS. 3 and 4 are enlarged fragmentary sections of the closed and full lift positions, respectively, of the seating elements contained within the encircled portion of FIG. 2.
Figure 4:
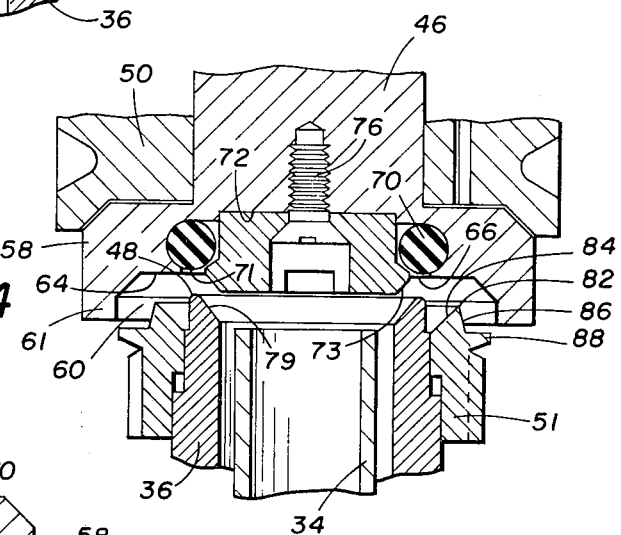

Referring more specifically to FIG. 2, pilot valve 12 comprises base 36 supported on bonnet 38 secured to main body 14. Base 36, in turn, supports a pilot bonnet 40 containing compressed load spring 42 acting downwardly against a vertical spindle 44. The lower end of spindle 44 engages the topside of pilot disc 46 for transmitting the spring force downward against the disc enabling it to cooperate with seat 48 formed as an annular rounded apex in the end face of nozzle 49. The nozzle itself is comprised of a necked down portion at the upper end of base 36 and supports an adjusting ring 51 vertically positionable for blowdown control in a manner to be described. Arranged to guide movement of disc 46 in the course of moving between closed and full lift relative to seat 48 is a guide 50 adjustably secured in position by a lateral set screw 52. Pipe 54 communicates fluid discharge at outlet 56 of the pilot valve to main valve outlet 28.

For an understanding of the invention, specific reference is not made to FIGS. 3–6. Closure or seating of disc 46 against seat 48 is effected via its lowermost portion comprised of an annular skirt 58 surrounding an inwardly dished or recessed portion 60. Defining recess 60 is a vertical skirt flange 61 joined inwardly with a bevelled shoulder 62 that merges into a radial face 64. Defined axially formed through face 64 is an aperture 66 that opens into an inward gasket pocket 68 and forming with face 64 a thin annular lip 69 preferably on the order of about 0.003 to 0.012 inches thickness.

Contained within pocket 68 is an O-ring resilient gasket 70 having a sealing surface 71. The gasket is of composition compatible with operating conditions of the valve and of ring size operably matched to the diameter of seat 48. Supporting O-ring 70 is an O-ring retainer 74 positioned in a counterbore 72 and secured to disc 46 at its underside by means of screw 76. Retainer 74 includes a bevelled annulus 73 that cooperates with the inside bevelled surface 79 of nozzle 49 for guiding disc 46 into seating relation between seat 48 and gasket 70 effected when the latter is annularly indented by the former. Formed through annulus 73 are a plurality of radial through slots 75 having an upper or inside face 83 and connecting with a plurality of vertical notches or slots 77 distributed about the ring periphery. The plane of face 83 is preferably in substantial alignment with the plane of skirt face 64. By means of these notches, system pressure in nozzle 49 is further communicated to directly against the exposed surface of gasket 70 represented generally by the surface 81 included in the angle 85. Maintaining a minimum gap 87 and 90 on the order of about 0.002–0.008 inches between gasket surface 81 and the planes of tangency with retainer 74 assures symmetrical pressure communication through slots 77 against the gasket. At the same time, binding of the gasket surface is avoided. In this manner, system pressure acting against surface 81 with the valve in closed position contributes to an enhanced sealing between the gasket and seat 48.

Cooperating with the seating end of disc 46 is adjusting ring 51 which is vertically adjustable on nozzle 49 in a well known manner for controlling or varying blowdown operation. In addition to blowdown control the nose end of ring 51 is adapted when disc 46 is in the closed position of FIG. 3 to extend inward of skirt 58 to form therewith a first huddle chamber 78 and a second serially operable huddle chamber 80. For that purpose, the nose of ring 51 terminates at a radially intermediate location in an annular apex or peak 82 formed between merging obtuse walls 84 and 86. At the same time, a radial flange 88 extends from wall 86 to a concentric location contiguously spaced from skirt flange 61 to form substantially enclosed huddle chamber 80. By virtue of this arrangement, blowdown control is substantially enhanced. With a combined effect provided by the staged huddle chambers and increased discharge flow at incipient liftoff, blowdown is less sensitive than previously to the vertical setting of ring 51. Increased displacement setting between the ring and disc as compared to previous settings continue to afford reliable short blowdown operation. At the same time, the upper adjustment setting where maximum blowdown is obtained continues effective to successfully pop the valve.

Figure 5:
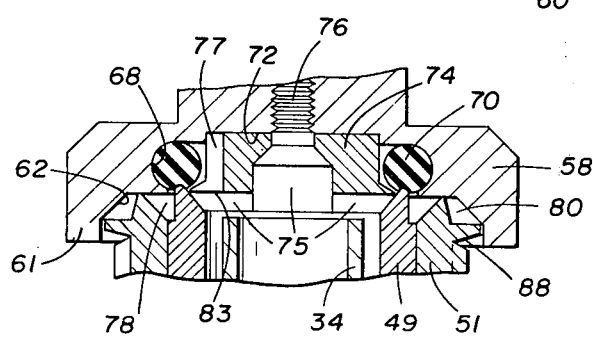
FIG. 5 in an enlarged fragmentary section generally corresponding to FIG. 3 but viewed from a different angularly displaced location about the passage axis.
Figure 6:
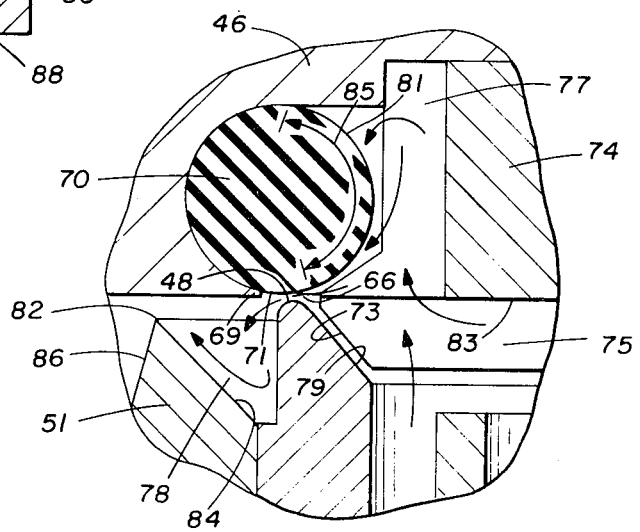
FIG. 6 is a diagrammatic fragmentary enlargement through the seating elements hereof represented at incipient lift condition of the valve disc.

In operation, with the pilot valve closed in the manner shown in FIGS. 3 and 5, annular seat 48 indents gasket 70 to form a pressure seal thereat able to contain upstream pressure against leakage or discharge to outlet 56. When system pressure reaches and begins to exceed the set point of the valve, the increasing pressure acting upward on disc 46 prompts a slight lift of the disc to the approximate relationship shown in FIG. 6 whereby initial flow of system fluid is instantly effected past seat 48 to first huddle chamber 78. Unlike previous constructions in which for every unit or distance of vertical lift an even narrower flow gap resulted past nozzle seat 79 causing a high pressure drop to be incurred therepast, this construction completely eliminates the latter gap and its consequent pressure drop. Without high pressure drop encountered by the discharge flowing past seat 48, the fluid enters first huddle chamber 78 with sufficient pressure able to instantly prompt additional lift of the disc. Sequentially thereafter, the fluid discharge enters second huddle chamber 80 in which the piston-like arrangement afforded between close fitting flange 88 and skirt flange 61 prompts a hair trigger accelerated liftoff of the disc to full lift position. Since liftoff is virtually spontaneous from the onset, the previous simmer problems are substantially if not completely overcome. With the pilot valve in open position the pressure in dome 29 is drained enabling upstream system pressure to lift main disc 22 for effecting relief discharge to outlet 28. When system pressure decreases to within the blowdown setting of ring 51, pilot 12 closes permitting equalization of pressure in dome 29. With dome pressure again acting downward against the topside of disc 22 in combination with the force of spring 25, the disc is returned to its closed position.

By the above description there has been disclosed a novel pilot valve operator for safety relief valves resolving the previous problem of simmer at incipient liftoff of the valve disc. Rather than permitting the valve to simmer as before, the structure hereof affords hair trigger acceleration of the disc liftoff to a higher lift position than previously possible. It has been found that not only is the previous problem of simmer eliminated but incidental thereto the arrangement has been rendered less operationally dependent on load spring characteristics enabling a fewer number of spring rates to be employed in meeting the range of capacity demands normally encountered with such valves. Moreover, blowdown characteristics for such valves are substantially enhanced by virtue of the specific construction of adjusting ring 51 eliminating the previous valve tendency to over react or chatter when placed in less desirable operation conditions where starvation could be a factor. Whereas the invention hereof has been described in the preferred application of a pilot operator, it is not intended to be so limited since its operating principles are readily adaptable to a direct responsive relief valve devoid of a pilot operator.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A safety relief valve adapted for effecting relief of overpressure in a fluid system comprising in combination:
   a. body means defining an inlet passage adapted to receive fluid pressure from the system to which the valve is exposed;
   b. seat means surrounding the downstream end of said inlet passage;
   c. disc means operably movable toward and away from said seat means for cooperating with said seat means to open and close said passage to fluid flow at magnitudes of fluid pressure above and below set pressure, respectively;
   d. resilient gasket means supported on one of said disc means or said seat means adapted to cooperate with a seating surface on the other of said seat means or said disc means for effecting a pressure seal closure therebetween in the closed position of said disc means; and
   e. communicating means operatively effective during the closed position of said disc means to communicate system pressure in said passage into an exposed relation with the upstream side of said seal closure.

2. A safety relief valve according to claim 1 which said valve comprises a pilot operator for effecting main valve operation.

3. A pilot operator according to claim 2 including means defining series staged huddle chambers in the fluid flow passage downstream from said seat means.

4. A pilot operator according to claim 3 in which said huddle chambers are defined by an adjustment ring surrounding said seat means and a skirt carried by said disc means cooperating with the confronting surfaces of said adjustment ring to form said huddle chambers therebetween.

5. A pilot operator according to claim 4 in which at least one stage of said huddle chambers defines a piston-like cooperation of elements for effecting accelerated liftoff of said disc means to full lift position.

6. A pilot operator according to claim 5 in which the confronting surfaces of said adjustment ring includes an apex defined at a radially intermediate location thereon and adapted when said disc is in closed position to closely approach the confronting surface of said disc for defining a separation between said huddle chambers.

7. A pilot operator according to claim 3 including a gasket retainer supporting said gasket means on said disc means.

8. A pilot operator according to claim 7 in which said gasket retainer is of shape and size substantially complementing the size and shape of the downstream end of said inlet passage and is adapted when said disc is in said closed position to interfit within said passage end.

9. A pilot operator according to claim 8 in which said communicating means comprises at least one aperture defined extending through said gasket retainer.

10. A pilot operator according to claim 9 in which said communicating means also includes at least one axially extending slot in the periphery of said gasket retainer in open communication with said aperture and is effective to transmit system pressure against said gasket means for urging said gasket means against said seat means.

11. A pilot operator according to claim 10 in which said gasket means comprises an annular O-ring gasket.

12. A pilot operator according to claim 10 in which said huddle chambers are defined by an adjustment ring surrounding said seat means and a skirt carried by said disc means cooperating with the confronting surfaces of said adjustment ring to form said huddle chambers therebetween.

13. A pilot operator according to claim 12 in which the confronting surfaces of said adjustment ring includes an apex defined at a radially intermediate location thereon and adapted when said disc is in closed position to closely approach the confronting surface of said disc for defining a separation between said huddle chambers.

* * * * *